(12) United States Patent
Ziarati

(10) Patent No.: US 6,557,404 B2
(45) Date of Patent: May 6, 2003

(54) VEHICLE TIRE INFLATION APPARATUS

(76) Inventor: Gholamreza Ziarati, 228 Lovelace Dr., Apt. 13, Tallahassee, FL (US) 32304

( * ) Notice: Subject to any disclaimer, the term of this patent is extended or adjusted under 35 U.S.C. 154(b) by 0 days.

(21) Appl. No.: 09/779,579

(22) Filed: Feb. 9, 2001

(65) Prior Publication Data

US 2002/0108434 A1 Aug. 15, 2002

(51) Int. Cl.[7] .............................. G01M 17/02
(52) U.S. Cl. ........................................ 73/146
(58) Field of Search ............................... 73/146–146.8; 141/38; 152/415; 206/303; 137/231

(56) References Cited

U.S. PATENT DOCUMENTS

| | | | |
|---|---|---|---|
| 1,142,772 A | 6/1915 | Lipman | |
| 1,259,431 A | 3/1918 | Nelson | |
| 1,475,252 A | 11/1923 | Swanjord | |
| 1,492,838 A | 5/1924 | Dilweg | |
| 2,227,601 A | 1/1941 | O'Brien, Jr. | |
| 2,237,559 A | 4/1941 | Jenne | |
| 2,278,664 A | 4/1942 | Mitchell | |
| 2,663,348 A | 12/1953 | Farris | |
| 4,037,638 A | 7/1977 | Mosca | |
| 4,269,312 A | 5/1981 | Bressler | |
| 4,852,624 A | 8/1989 | Belrose | |
| 5,419,377 A | 5/1995 | Harris | |
| D360,457 S | 7/1995 | Levisay | |
| 5,928,443 A | 7/1999 | Jorda et al. | |

FOREIGN PATENT DOCUMENTS

| | | |
|---|---|---|
| FR | 628019 | 8/1928 |
| FR | 984569 | 7/1951 |
| GB | 242792 | 11/1925 |

*Primary Examiner*—Hezron Williams
*Assistant Examiner*—Marissa Ferguson
(74) *Attorney, Agent, or Firm*—Dowell & Dowell, P.C.

(57) ABSTRACT

An apparatus for emergency inflation of vehicle tires which includes an air transfer tube having a pressure gauge mounted along a length thereof and which tube is connected at its opposite ends to a pair of air valve chucks each of a size to cooperatively engage and selectively open an air valve of a conventional tire to thereby permit a regulated transfer of air between two or more vehicle tires.

16 Claims, 2 Drawing Sheets

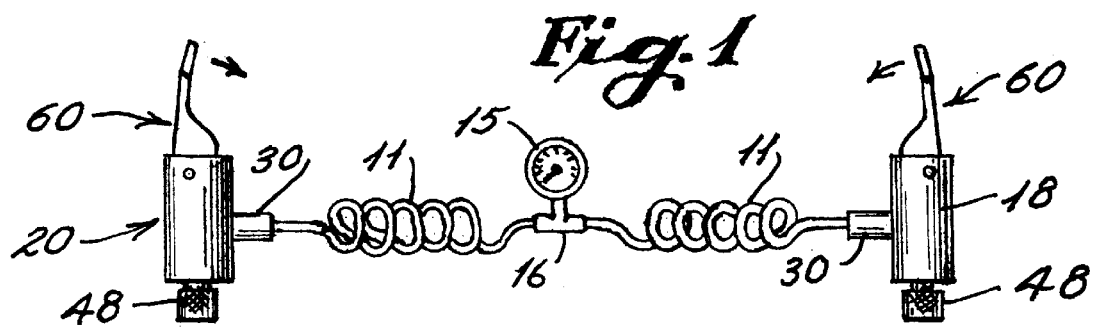
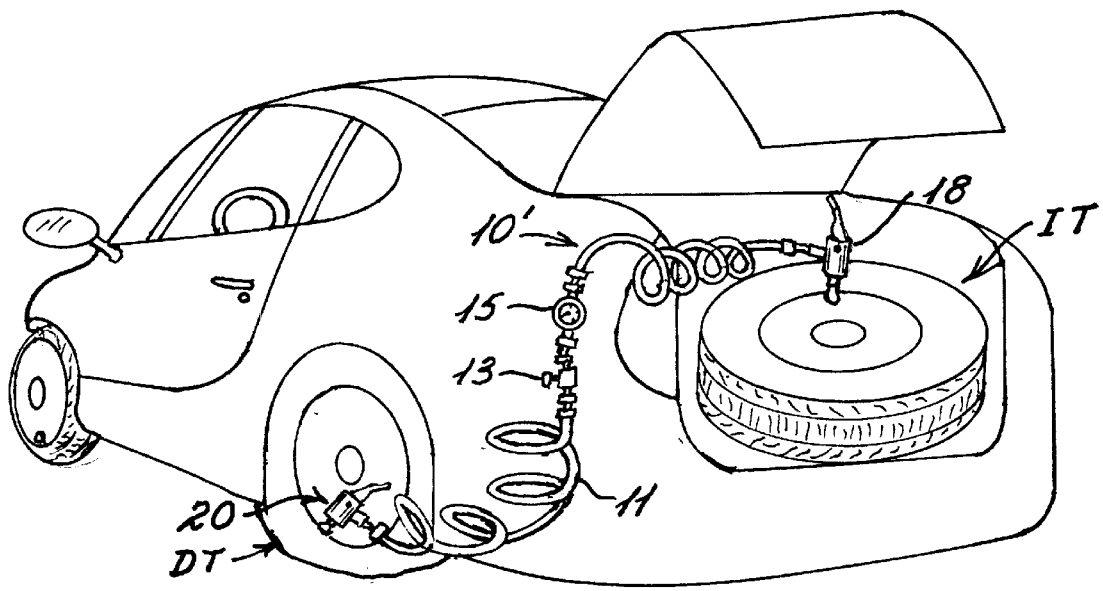
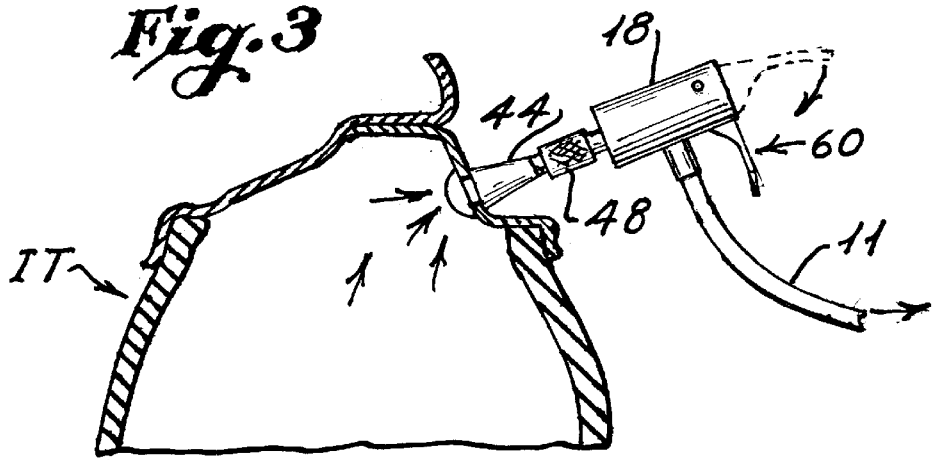

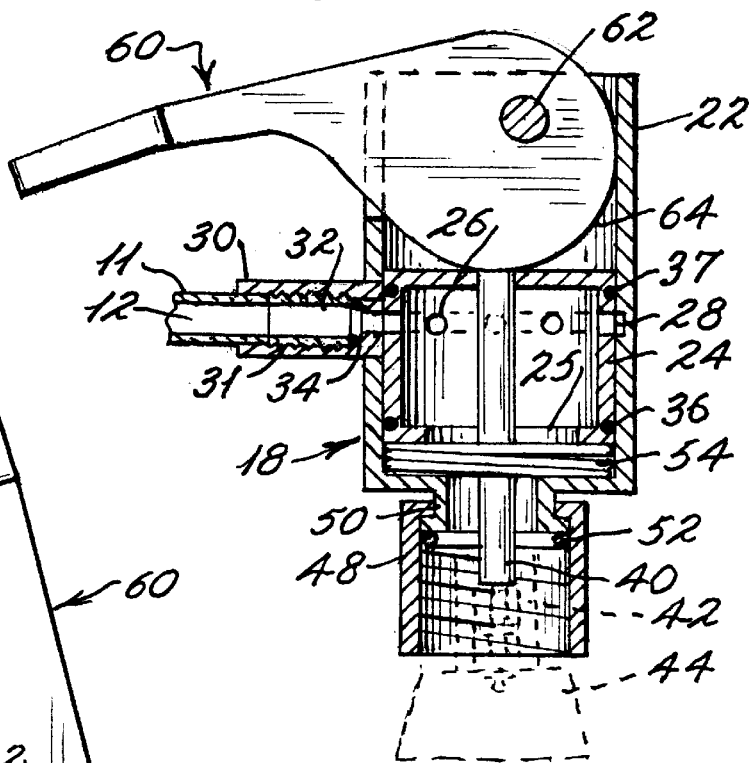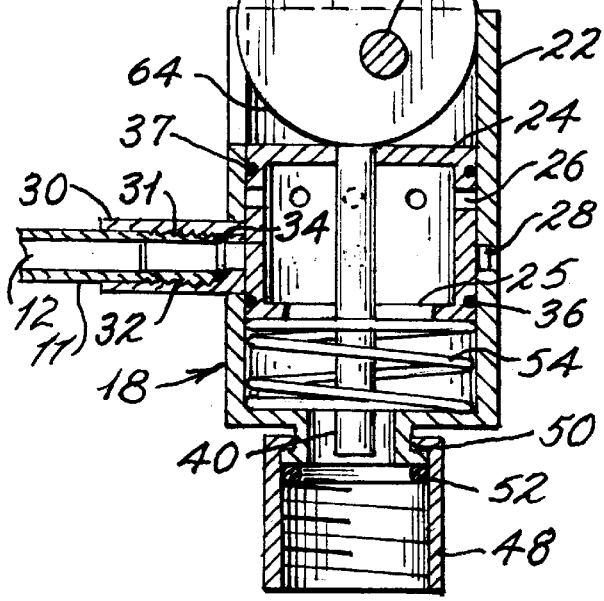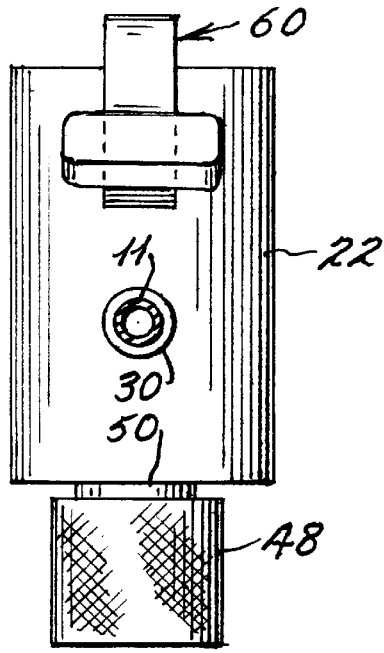

VEHICLE TIRE INFLATION APPARATUS

BACKGROUND OF THE INVENTION

1. Field of the Invention

This application is generally directed to devices for providing emergency inflation of vehicle tires or other articles and more specifically to a tire inflation apparatus which provides an elongated pliable air transfer tube having a gauge mounted along the length thereof with similar valve chucks being mounted at opposite ends of the tube. The valve chucks may be secured to valve stems of conventional tires to provide for transfer of air from inflated tires to a deflated tire.

2. Brief Discussion of the Related Art

Most vehicle drivers have at one time or another experienced the inconvenience of a flat tire. Flat tires are often caused by faulty valves or by slow leaks created by punctures created by sharp objects which may remain in place, such as when a nail penetrates a tread of a tire and becomes lodged in the tire but permits a slow leak of pressurized air. When a tire becomes flat, it is necessary to stop a vehicle and either inflate the tire or replace the tire with a spare, if a spare tire is available. However, there are many instances where individuals can not physically change a tire or where, due to the lack of or faulty tire changing equipment such as jacks and jack handles, it is not possible to effect a change between a flat tire and a spare.

There have been numerous products developed to provide for emergency inflation of vehicle tires to permit emergency use of a vehicle so that vehicle can be driven to a repair facility wherein the damaged tire can be properly fixed or replaced. Some such innovations include hand or foot operated pumps or battery operated pumps which may be connected to a vehicle electrical system to inject air into a flat tire. Unfortunately, hand or foot operated type pumps require a great deal of physical ability and, in many cases, individuals can not properly operate such devices. Further, even where an individual can physically work a hand or foot operated pump, it is often a slow and tedious process to inflate a tire to a degree wherein a vehicle can be safely moved. Likewise, many battery operated pumps are slow and inefficient.

Another type of emergency inflation device includes containers having pressurized substances therein which substances may be injected through a valve of a conventional tire for sealing the interior surface of the tire and to provide a measure of pressurized gas to allow for emergency movement of the vehicle. Unfortunately, such inflation devices must be purchased ahead of time and have limited storage life. Further, once a container is used, it must be replaced, thereby requiring an expenditure of funds for the replacement container.

In view of the foregoing, there have been other innovations developed to permit transfer of air between a spare tire or other tires of a vehicle and a flat tire. By way of example, in U.S. Pat. No. 1,492,838 to Dilweg, a device for transmitting compressed air between two vehicle tires is disclosed which includes a flexible tube having air chucks at each end which are adapted to be engaged such that one chuck is connected to open the valve stem of a flat tire and the opposite chuck is utilized to open the valve stem of an inflated tire such that pressure from the inflated tire is transferred to the flat tire. Unfortunately, devices as disclosed in the reference to Dilweg do not adequately provide for a safe and efficient transfer of air pressure, especially in instances where the flat tire is not caused by a slow leak but has been caused by a slash or large hole in the tire, such that the tire can not retain any air pressure. If a badly damaged flat tire is connected to an inflated tire, the air from the inflated tire will continuously bleed through the damaged tire resulting in the complete depletion of pressurized air from the inflated tire thus creating a situation where the vehicle now has two tires which are inoperative.

In an effort to improve upon the basic concept of providing an air transfer tube to permit the transfer of pressurized air from an inflated tire to a deflated tire, special valves have been proposed to limit the transfer of air to a deflated tire. In U.S. Pat. No. 4,269,312 to Bressler such a device is disclosed wherein one of the chucks includes a spring biased check valve for cutting off flow from the inflated tire to the deflated tire when pressure entering the chuck is at a predetermined level. Unfortunately, if the damaged tire has been badly damaged there will have been a transfer of a significant portion of air from the inflated tire before the flow of pressurized air is terminated thus making the vehicle relative unsafe to drive.

In view of the foregoing, there remains a need to provide for a device for transferring air between the tires of a vehicle, including a spare tire, and a tire which has been deflated wherein the device can be used without depleting the air pressure of a pressurized tire in the event the tire to receive air is badly damage such that it can not retain air pressure, thus preventing the adverse depletion of air from good tires when attempting to fill a flat tire.

Some additional examples of prior art air transfer devices are disclosed in U.S. Des. Pat. No. 360,457 to Levisay, U.S. Pat. Nos. 2,663,348 to Farrish, 4,037,638 to Mosca, 5,419,377 to Harris and 5,928,443 to Jorda et al.

SUMMARY OF THE INVENTION

The present invention is directed to an emergency vehicle tire inflation apparatus which includes a pliable air transfer tube which is preferably in the form of a coiled tube having opposite ends. The air transfer tube defines a central air passageway. A pressure gauge is mounted to the air transfer tube along the length thereof so as to be in communication to measure pressure within the air passageway of the transfer tube. Special valve chucks are provided at each of the ends of the air transfer or inflation tube with each valve chuck being, in a preferred embodiment, similarly constructed so the valve chucks may be used interchangeably with a deflated or an inflated tire.

With the present invention, the air valve chucks include a first connector for connecting the valve chucks to the air transfer tube and a second rotatable connector which is designed to cooperatively seat with and seal against a conventional valve stem of a vehicle tire so that the valve chuck may be seated in sealed engagement with a valve stem prior to the valve of the valve chuck being operated. Each valve chuck further includes an interior valve member which is movable from a first position in which air flow through the valve chuck is prohibited to a second position wherein a pin carried by the valve member opens the valve stem of the conventional vehicle tire while a fluid passageway through the valve chuck is opened between the air transfer tube and the valve stem. In preferred embodiments, the operation of the valve chuck assembly is controlled by a pivotable lever or handle which is mounted slightly off-center to provide a camming surface to move the valve member from one position to another and such that the valve member is retained in an open position unless closed by manual movement of the handle or lever.

In some embodiments, a separate shut-off valve may be positioned along the air transfer tube to control air flow therethrough without the need to operate the valve chucks once they are placed in an operative position and opened to permit air flow therethrough.

The invention is also directed to a method of safely transferring air from a spare tire or an inflated vehicle tire to a flat tire of a vehicle wherein an air transfer tube is provided having valve chucks at opposite ends such that the air transfer tube may be secured between the valve stem of a flat tire and the valve stem of an inflated tire without initially allowing any air transfer between the tires. Further, with the methodology of the invention, a gauge is provided along a length of the air transfer tube such that by opening each valve chuck individually, a pressure reading can be taken with respect to not only the inflated tire but with respect to the deflated tire. Using the methodology, monitoring the pressure of the deflated tire for a short period of time will give an accurate reflection of whether the deflated tire has a type of leak which will allow emergency inflation for limited roadway use, such as when the cause of the leak of the deflated tire will allow a retention of air pressure for a period of time as opposed to a large opening in the tire which prevents the tire from retaining air pressure.

Using the apparatus of the present invention, it is possible to transfer air from an inflated to a deflated tire without accidentally releasing the air pressure through the deflated tire to atmosphere. Further, utilizing the apparatus and methodology of the invention, it is possible to use only a portion of the pressurized air from several tires to inflate and balance pressure between not only the deflated tire but between opposite tires of a vehicle so that the tire pressure on opposite sides of a vehicle is balanced before a vehicle is moved under an emergency situation.

It is therefore the primary object of the present invention to provide an air transfer device which can be used to transfer air pressure from one or more tires of a vehicle to a deflated tire wherein accidental loss of air pressure due to a badly damaged deflated tire is prevented and wherein the balancing of pressure between various tires of a vehicle may be accomplished with a gauge being provided to ensure accurate balancing of air pressure.

It is yet a further object of the present invention to provide an emergency apparatus for allowing the inflation of a tire having a slow or minor leak therein wherein the device can be easily stored in a vehicle and may be used not only to transfer air between tires of a single vehicle but wherein air can be transferred from one or more tires on one vehicle to one or more tires of another vehicle with tire pressures being monitored as air is transferred from one tire to another.

BRIEF DESCRIPTION OF THE DRAWINGS

A better understanding of the invention will be had with respect to the attached drawing figures wherein:

FIG. 1 is a perspective illustrational view of an air transfer apparatus in accordance with the teachings of the present invention;

FIG. 2 is an illustrational view showing a variation of the apparatus of FIG. 1 connected between a spare tire and a flat tire of a vehicle;

FIG. 3 is a partial cross-sectional illustrational view showing one of the valve chucks of the present invention as it is connected to a conventional valve stem of a vehicle tire;

FIG. 4 is an enlarged cross-sectional view of a valve chuck of the present invention wherein the valve is shown in a first closed position to prevent air flow therethrough;

FIG. 5 is a cross-sectional view similar to FIG. 4 showing the valve of the valve chuck being moved to an open position to permit air transfer therethrough; and FIG. 6 is a side elevational view of the valve chuck of FIGS. 4 and 5.

DESCRIPTION OF THE PREFERRED EMBODIMENT

With continued reference to the drawing figures, the vehicle air inflation apparatus 10 of the present invention is shown including an elongated pliable hollow tube 11 which, in a preferred embodiment, is coiled as shown in FIG. 1 to permit compact storage when the apparatus is not in use. The tube is constructed of material which will safely stand elevated pressures with the strength of the material varying depending upon the intended use. Therefore, the material for an inflation apparatus to be used with trucks will have a substantially greater resistance to air pressure than one designed for use with automotive vehicles.

The tube 11 defines a hollow passageway 12 through which air can be transferred. The hollow passageway is shown in FIGS. 4 and 5.

Mounted along the length of the air transfer tube 11 is a conventional air pressure gauge 15. The gauge includes a base "T" connector 16 which is connected to portions of the air inflation tube 11 such that a reading may be taken when air pressure is flowing in either direction relative to the gauge through the tube. Although the gauge is shown as being mounted centrally of the tube 11, in some embodiments, the gauge is preferably mounted more closely adjacent an end of the tube and preferably toward valve chuck 20.

The outer ends of the tube are connected to a pair of valve chuck assemblies 18 and 20 which, in the preferred embodiment, are of identical construction such that either valve chuck may be mounted to a deflated tire, such as shown at "DT" in FIG. 2, or to an inflated tire "IT", also shown in FIG. 2, to thereby allow regulated transfer of air from the inflated to the deflated tire.

It should be noted that the apparatus 10' shown in FIG. 2 is a variation of that shown in FIG. 1. The apparatus 10' has been modified to include an on-off valve 13 along the air transfer tube 11. The on-off valve can be used to control air flow through the tube when the valve chuck assemblies 18 and 20 are connected, as shown in FIG. 2, to transfer air between the inflated tire "IT" and the deflated tire "DT". By using the valve 13, the valve chucks can remain open, as will be discussed below, and air flow can be controlled or terminated.

With specific reference to FIGS. 4–6, the structure of one of the valve chuck 18 is shown, the structure for valve chuck 20 being the same. Valve chuck 18 includes a generally cylindrical housing 22 in which is movably mounted a generally cylindrical valve 24. The valve 24 is open at it's forward end 25 to permit air flow which enters the valve through a plurality of openings 26 formed in the upper periphery thereof. The openings 26 communicate with an annular channel 28 formed within the housing which channel communicates with a fitting 30 extending from the housing and which is designed to be connected to the air transfer tube 11. The fitting 30 is internally threaded as shown at 31 in order to cooperatively receive a threaded sleeve 32 which is mounted on the end of the tube 11. A seal is provided by an o-ring 34 such that when the sleeve 32 is threaded into the fitting 30, the end of the tube is sealed relative to the fitting.

Air pressure being transferred through the air valve chuck 18 is prevented from escaping the ends of the housing by providing a pair of o-rings 36 and 37 which are seated within annular grooves in the sidewalls of the valve 24 and which engage the innersurface of the housing 22.

The valve 24 further carries a plunger or pin 40 which extends forwardly thereof and which is operable to engage a valve member 42 associated with a conventional valve stem 44 of a vehicle tire.

The valve chuck 18 is selectively connected to the conventional valve stem 44 by way of an adapter or rotatable sleeve 48 which is mounted on a recessed neck 50 of the housing 22. An o-ring 52 is mounted adjacent the neck 50 within the sleeve 48 for purposes of sealing the sleeve against the valve stem to prevent air leakage when the valve chuck is attached to a conventional valve stem, as shown in FIGS. 2 and 3. It should be noted that the sleeve 48 allows for the valve chuck 18 to be secured in place without rotation of the housing 22, as the sleeve 48 is rotatable relative to the housing and thus can be secured by rotation of the body of the sleeve relative to the valve stem.

A spring 54 is provided, in a preferred embodiment, to normally urge the valve 24 to a first or closed position as shown in FIG. 4. In the first or closed position, the spaced openings 26 which allow flow through the valve member 24 are spaced from the annular channel 28 formed in the sidewall of the housing 22 and thus there is no communication between the air transfer tube 11 and the sleeve 48 which is connected to the valve stem 44. In order to allow the transfer of air either to or from the valve stem 44, the valve 24 is moved to a second or open position, as shown in FIG. 5 of the drawings, wherein the openings 26 align with the channel 28 thereby permitting flow from the air transfer tube 11 to the valve stem 44 or vice-a-versa.

The movement of the valve member 24 between the first and second positions is controlled by operating a lever or handle 60. The lever is connected by a pivot pin 62 to an upper portion of the housing 22. The lever or handle includes a base which forms a camming surface 64 for pushing the valve member from the first to the second positions. The camming surface is somewhat offset with respect to the pivot pin 62 such that when the lever is rotated to the position shown in FIG. 5, the handle will not slip and must be manually maneuvered to move the valve to the position shown in FIG. 4.

In the use of the vehicle tire inflation apparatus 10 of the present invention, in the event of a flat tire, the apparatus is placed into use by initially connecting one of the air valve chucks 18 or 20 to the valve stem 44 of a deflated tire, such as shown in FIG. 2, with the opposite valve chuck being connected to an inflated tire. It should be noted that, although a spare tire is shown as being the inflated tire in drawing FIG. 2, it is within the teachings of the present invention that the air transfer tube 11 can be extended between any tire of a vehicle. It is important that the apparatus of the present invention can be used to transfer air between any vehicle tire so that a proper balancing of pressures within the various tires of a vehicle may be accomplished to allow a very safe and stable transport of a vehicle after an emergency inflation has been performed.

Once the air valve chucks 18 and 20 are secured to the valve stems of the deflated and inflated tire with the valves 24 of each valve chuck being positioned in the first or closed position, it is possible to move the valve member of the valve chuck connected to the inflated tire in order to determine an initial pressure reading from the gauge 15. By closing the valve chuck connected to the valve stem of the inflated tire and opening the valve of the valve chuck connected to the deflated tire, an initial pressure reading may be taken with respect to the deflated tire. In order to transfer air from the inflated tire to the deflated tire both of the valves of the valve chucks 18 and 20 are placed into the second or open position allowing the transfer of pressurized air from the inflated tire to the deflated tire.

One of the advantages of the present invention is that a determination can be made after an initial amount of air is transferred as to whether or not an increase of air pressure has been established within the deflated tire. Therefore, normally, an operator will allow a transfer of a limited amount of pressurized air from the inflated tire to the deflated tire after which the valve chuck connected to the inflated tire is closed preventing further transfer of pressurized air. In the embodiment of FIG. 2, instead of closing the valve chuck connected to the deflated tire, the valve 13 can be operated to terminate flow toward the deflated tire without the operator having to move to the deflated tire. Thereafter, after closing the valve chuck 18 to the inflated tire, the valve 13 is opened and a pressure reading taken with respect to the pressure within the deflated tire. In this manner, a determination can be made if the deflated tire is actually retaining any of the pressurized air which has been transferred thereto. If a tire has been cut such that it can not retain pressure, the gauge will reflect that no pressure build up has been accomplished and, therefore, the operator knows that further transfer of air from the inflated tire to the deflated would be of little value, in fact, would be counter productive. However, if an increase in pressure is reflected on the pressure gauge 15, the operator knows that the deflated tire can retain an emergency supply of pressurized air to allow movement of the vehicle to a place where a complete repair of the tire can be made. Thereafter, the operator can open the air valve chuck connected to the valve stem of the inflated tire, and the on-off valve 13 in the embodiment of FIG. 2, to allow a measured transfer of air pressure to the deflated tire.

It is preferred, utilizing the methodology of the present invention, that a balancing of pressure between the various tires of a vehicle be accomplished to permit safe movement of a vehicle. Therefore, only a portion of the pressurized air from the inflated tire shown in FIG. 2 would be transferred to the deflated tire. Afterwhich, the valve chuck 18 which is connected to the inflated tire would be moved to a different vehicle tire with a subsequent transfer of a measured amount of pressure from the subsequent inflated tire to the deflated tire. In this respect, the pressure between the various tires may be balanced on opposite sides of the vehicle such that the two front tires and/or the two rear tires have essentially the same air pressure. In this manner, sufficient air pressure can be transferred to the deflated tire without adversely effecting the safe operation of the remaining inflated tires from which air pressure has been withdrawn for the emergency inflation of the deflated tire.

Once a transfer of air has been made to inflate the deflated tire, the apparatus of the invention may be quickly removed and compactly stored within a vehicle for future use. The coiling of the air transfer tube 11 allows for such a compact storage.

The foregoing description of the preferred embodiment of the invention has been presented to illustrate the principles of the invention and not to limit the invention to the particular embodiment illustrated. It is intended that the scope of the invention be defined by all of the embodiments encompassed within the following claims and their equivalents.

I claim:

1. A vehicle tire inflation apparatus including a pliable air transfer tube having opposite ends, said air transfer tube defining an air passageway, a pressure gauge mounted to said air transfer tube so as to be in fluid communication with said air passageway to determine air pressure therein, a pair of valve chuck assemblies mounted to said opposite ends of said air transfer tube so as to be in fluid communication with said air passageway, an on-off valve mounted along said air transfer tube for selectively controlling flow of air therethrough, each of said valve chuck assemblies including a housing, means for connecting each of said housing so as to be in fluid flow communication with a valve stem of a conventional tire, a valve mounted within each of said housings and moveable from a first position to prevent air flow through said housings to a second position to permit air flow through said housings, and each of said valve chuck assemblies including a manually engageable means for moving said valves between said first and second positions.

2. The vehicle tire inflation apparatus of claim 1 in which each housing is generally cylindrical including a channel formed within an interior sidewall thereof, each valve being generally cylindrical having a plurality of spaced openings therethrough which openings communicate with said channel when said valve is in said second position to permit air flow through said valve within said housing, and means for sealing said valve in sliding relationship with said housing.

3. The vehicle tire inflation apparatus of claim 2 including a plunger mounted to each of said valves, said plungers being adapted to engage a valve of a conventional tire valve stem when said valves are moved to said second position.

4. The vehicle tire inflation device of claim 3 including a connector means rotatably connected to each of said housings, each connector means being adapted to threadingly engage a conventional valve stem of a tire, means for securing said connector means to said housing so as to be movable with respect thereto, and means for sealing each of said connector means in air tight relationship with respect to said housings.

5. The vehicle tire inflation apparatus of claim 4 in which each means for moving said valves between said first and second positions includes a lever pivotally mounted to said housings, said levers engaging an upper surface of said valves, and resilient means for normally urging said valves towards said first position.

6. The vehicle tire inflation apparatus of claim 1 in which said air transfer tube is coiled to facilitate compact storage.

7. A method for transferring air between an inflated tire of a vehicle and a deflated tire of a vehicle using an air transfer tube having an air pressure gauge with valve chucks mounted at opposite ends of the air transfer tube and wherein said valve chucks are adapted to be secured to valve stems of vehicle tires and which are operable to open or close valves associated with such valve stems, the method comprising the steps of:

a) connecting one of said valve chucks to a valve stem of the deflated tire and connecting the other valve chuck to a valve stem of an inflated tire with each of the valve chucks being connected to prevent air flow therethrough, b) opening the valve chuck connected to the inflated tire and determining the pressure within the inflated tire, c) opening the other of the valve chucks connected to the deflated tire for a limited period of time to allow an initial transfer of air from said inflated tire to the deflated tire, d) closing the valve chuck connected to the inflated tire, and monitoring the pressure within the deflated tire to determine if an increase in pressure has been established, e) reopening the valve chuck connected to the inflated tire to permit further air transfer to the deflated tire in the event the air pressure gauge shows the deflated tire is retaining pressure and allowing transfer of air until a predetermined decrease in pressure is determined within the inflated tire, and f) thereafter, closing air flow through said air transfer tube between the inflated tire and the deflated tire.

8. The method of the claim 7 including the additional step of removing the valve chuck from the inflated tire and connecting the valve chuck to a subsequent inflated tire and thereafter opening the valve chuck to further transfer air from the subsequent inflated tire to the deflated tire until a predetermined pressure is noted and thereafter closing air flow between the subsequent inflated tire and the deflated tire.

9. A vehicle tire inflation apparatus including a pliable air transfer tube having opposite ends, said air transfer tube defining an air passageway, a pressure gauge mounted to said air transfer tube so as to be in fluid communication with said air passageway to determine air pressure therein, a pair of valve chuck assemblies mounted to said opposite ends of said air transfer tube so as to be in fluid communication with said air passageway, an on-off valve mounted along said air transfer tube for selectively controlling flow of air therethrough, each of said valve chuck assemblies including a housing, means for connecting each of said housings so as to be in fluid flow communication with a valve stem of a conventional tire, a valve mounted within each of said housings and moveable from a first position to prevent air flow through said housings to a second position to permit air flow through said housings, and each of said valve chuck assemblies including a manually engageable means for moving said valves between said first and second positions.

10. The vehicle tire inflation apparatus of claim 9 in which each housing is generally cylindrical including a channel formed within an interior sidewall thereof, each valve being generally cylindrical having a plurality of spaced openings therethrough which openings communicate with said channel when said valve is in said second position to permit air flow through said valve within said housing, and means for sealing said valve in sliding relationship with said housing.

11. The vehicle tire inflation apparatus of claim 10 including a plunger mounted to each of said valves, said plungers being adapted to engage a valve of a conventional tire valve stem when said valves are moved to said second position.

12. The vehicle tire inflation device of claim 11 including a connector means rotatably connected to each of said housings, each connector means being adapted to threadingly engage a conventional valve stem of a tire, means for securing said connector means to said housing so as to be movable with respect thereto, and means for sealing each of said connector means in air tight relationship with respect to said housings.

13. The vehicle tire inflation apparatus of claim 12 in which each means for moving said valves between said first and second positions includes a lever pivotally mounted to said housings, said levers engaging an upper surface of said valves, and resilient means for normally urging said valves towards said first position.

14. The vehicle tire inflation apparatus of claim 9 in which said air transfer tube is coiled to facilitate compact storage.

15. A method for transferring air between an inflated tire of a vehicle and a deflated tire of a vehicle using an air transfer tube having an air pressure gauge and an on-off valve mounted thereto and having valve chucks mounted at opposite ends of the air transfer tube and wherein said valve chucks are adapted to be secured to valve stems of vehicle tires and which are operable to open or close valves associated with such valve stems, the method comprising the steps of:

a) connecting one of said valve chucks to a valve stem of the deflated tire and connecting the other valve chuck to a valve stem of an inflated tire with each of the valve chucks being connected to prevent air flow therethrough, b) opening the on-off valve, c) opening the valve chuck connected to the inflated tire and determining the pressure within the inflated tire, d) opening the other of the valve chucks connected to the deflated tire for a limited period of time to allow an initial transfer of air from said inflated tire to the deflated tire, e) closing the valve chuck connected to the inflated tire, and monitoring the pressure within the deflated tire to determine if an increase in pressure has been established, f) reopening the valve chuck connected to the inflated tire to permit further air transfer to the deflated tire in the event the air pressure gauge shows the deflated tire is retaining pressure and allowing transfer of air until a predetermined decrease in pressure is determined within the inflated tire, and f) thereafter, closing air flow through said air transfer tube between the inflated tire and the deflated tire.

16. The method of the claim 15 including the additional step of removing the valve chuck from the inflated tire and connecting the valve chuck to a subsequent inflated tire and thereafter opening the valve chuck to further transfer air from the subsequent inflated tire to the deflated tire until a predetermined pressure is noted and thereafter closing air flow between the subsequent inflated tire and the deflated tire.

* * * * *